No. 755,808. Patented March 29, 1904.

UNITED STATES PATENT OFFICE.

FRANK T. F. STEPHENSON, OF DETROIT, MICHIGAN.

SULFO-IODIN COMPOUND OF HYDROCARBON.

SPECIFICATION forming part of Letters Patent No. 755,808, dated March 29, 1904.

Application filed June 22, 1903. Serial No. 162,596. (Specimens.)

*To all whom it may concern:*

Be it known that I, FRANK T. F. STEPHENSON, a citizen of the United States, residing in the city of Detroit, in the county of Wayne and State of Michigan, have invented a certain new and useful Sulfo-Iodin Compound of Hydrocarbon Derived from the Benzin Series, of which the following is a description, whereby others skilled in the art may make and use the same.

My invention relates to the production of a new medicinal substance from those derivatives of benzin which contain one or more hydroxyl radicals alone or in combination with other radicals, in replacement of an equal number of hydrogen radicals of the benzin. To this class of derivatives belong such compounds as mono-hydroxy benzin, $C_6H_5OH$, (phenol,) methyl-hydroxy benzin, $C_6H_4.CH_3.OH$, (ortho, meta or paracresol,) ortho, meta, and para-dihydroxy benzin, $C_6H_4(OH)_2$, (pyrocatechin, resorcin, and hydroquinone,) dihydroxy-toluene, $C_6H_3.CH_3(OH)_2$, (orcin,) tri-hydroxy-benzin, $C_6H_3(OH)_3$, (pyrogallol,) ortho, meta, and para-hydroxy-benzoic acids, $C_6H_4.OH.COOH$, (salicylic, oxy-benzoic, and para-oxy-benzoic acids,) di-hydroxy-benzoic acids, $C_6H_3(OH)_2.COOH$, (protocatechuic acid,) tri-hydroxy-benzoic acid, $$C_6H_2.(OH)_3.COOH,$$

propyl-meta-cresol, $C_6H_3.CH_3.OH.C_3H_7$, (thymol,) and many others which need not be enumerated, since this list indicates with sufficient accuracy the class of compounds to which I refer. My invention relates to these compounds, in that I take any one of them and by suitable chemical reactions replace the oxygen of the hydroxyl radical with sulfur and the hydrogen of the hydroxyl radical with iodin, thus forming a new radical, (SI,) in this way making new chemical compounds that have not heretofore been described and which have great medicinal value as antiseptics.

I know that there have already been made and that there are in use certain medicinal compounds derived from hydroxyl containing derivatives of benzin, in which the hydrogen of the hydroxyl radical has been replaced by iodin; but my invention is an improvement upon these compounds, inasmuch as I replace the oxygen of the hydroxyl radical with sulfur, thus producing the new radical, (SI,) which gives to the compounds containing it new and valuable medicinal properties which cannot be secured by the presence of iodin alone.

Reference may be made to the patent to Joseph Massinger and Georg Vortmann, No. 446,875, dated February 24, 1891, for a product that is called "Aristol" by the manufacturers, in which the hydrogen in the hydroxyl radicals of the propyl-meta-cresol (thymol) is replaced by iodin. In my invention I make an improved medicinal substance from propyl-meta-cresol, for I replace one or both of the atoms of oxygen in the hydroxyl radicals of two molecules of propyl-meta-cresol with sulfur, and in this way I make a new and improved compound for medicinal use.

My invention is carried out as follows to make ten pounds of the substance:

A. Dissolve thirty-five pounds sodium hydrate in seven and one-half gallons of water and cool. Place in four Wolff bottles, putting more in the two bottles that are to go nearest to the gas-generator. Having fitted up a hydrogen-sulfid generator, connect with the Wolff bottles, and pass the gas through the hydrogen-sulfid solution until it is completely saturated with the gas, thus forming sodium hydrosulfid. The gas should flow slowly, and the saturation will not be complete until all the iron sulfid that forms a charge for a ten-gallon generator has been used up and the acid also. Mix the contents of the Wolff bottles.

B. Dissolve seven pounds sodium hydrate in six quarts of water, add five and one-fourth pounds of thymol, heat and stir until complete solution of thymol. Cool.

C. Mix A and B, stir well, and add enough saturated solution of sodium hydrate to keep solution clear, if needed.

D. Dissolve 4.35 pounds potassium iodid in 3.5 pints of water, by stirring and warming, or dissolve 1.5 pounds sodium hydrate in 2.75 pints of water, and in this dissolve 3.2 pounds iodin.

E. Mix C and D well.

F. Make up eighty gallons of a solution of chlorinated soda as follows: Mix eighty pounds chlorid of lime with forty gallons of water, breaking up the lumps and then allow to stand thirty minutes. Filter and make filtrate up to forty gallons by washing the contents of the filter. Dissolve one-hundred and twenty pounds carbonate of soda or its equivalent in soda-ash (44.5 pounds) in forty gallons of water and filter, if necessary. The water should be heated to nearly boiling. Mix the soda solution with the one from the clorid of lime, stir well, and set aside for an hour. Decant as much as will come off clear and filter the rest. Wash till filtrate measures eighty gallons.

G. Place six pints of chlorinated soda solution in each of twelve two-gallon bottles. To each add twelve ounces of solution E by pouring in a fine stream, constantly stirring the soda solution. If the temperature rises above 40° centigrade, cool the bottle by placing in cool water. Too high temperature will spoil the product by setting free some of the iodin, thus making the product red and wasting iodin. As soon as the precipitation is complete, as is shown by no more forming on stirring and supernatant liquid becoming clear, test a little of the liquid with excess of chlorin solution. If no color or precipitate appears, throw the precipitate into a centrifuge or on a rapid filter to get rid of the chlorin as rapidly as possible. Wash until free from alkali, as shown by phenolphthalein, and from chlorids, as shown by silver nitrate. Dry away from light in a current of air at a temperature not above 40° centigrade.

H. When perfectly dry, the lump should be very light brown in color, almost white, free from red, and easily friable. Pulverize in a mortar. Pass through sieves until the powder will pass through fine bolting-silk.

The reactions are probably expressed as

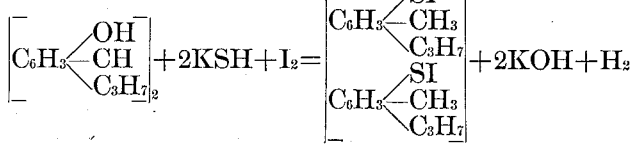

The precipitate when collected, washed, and dried forms an amorphous powder practically odorless, having sometimes a slight odor of iodin or unchanged thymol, slightly soluble in concentrated alkalies and absolute alcohol, insoluble in water and soluble in ether, chloroform, collodion, and fixed oils. Upon treatment with nascent chlorin it gives off free iodin, and upon combustion sulfur-dioxid is formed.

Having now explained my improvement, what I claim as my invention, and desire to secure by Letters Patent, is—

1. A new chemical compound, formed from an hydroxyl containing derivative of a hydrocarbon, by substituting the hydrogen of such hydrocarbon derivative by iodin and the oxygen by sulfur, being a very light brown powder, practically odorless, very slightly soluble in concentrated alkalies, and absolute alcohol, insoluble in water, and soluble in ether, chloroform, collodion and fixed oils.

2. A chemical compound formed from the hydroxyl containing derivatives of benzin having probably the formula

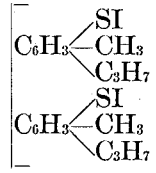

being a very light brown powder, practically odorless, very slightly soluble in concentrated alkalies and absolute alcohol, insoluble in water, and soluble in ether, chloroform, colloion and fixed oils.

In testimony whereof I have signed my name to this specification in the presence of two subscribing witnesses.

FRANK T. F. STEPHENSON.

Witnesses:
A. F. WILCOX,
EDWARD N. PAGELSEN.